United States Patent
Rocton

[11] 4,015,894
[45] Apr. 5, 1977

[54] CONNECTOR FOR OPTICAL FIBRES

[75] Inventor: Lucien Rocton, Malakoff, France

[73] Assignee: Compagnie Industrielle des Telecommunications Cit-Alcatel, Paris, France

[22] Filed: Nov. 10, 1975

[21] Appl. No.: 630,645

[30] Foreign Application Priority Data

Nov. 13, 1974 France .................. 74.37418

[52] U.S. Cl. .................................. 350/96 C
[51] Int. Cl.² .................................. G02B 5/14
[58] Field of Search .............. 350/96 C, 96 WG

[56] References Cited
UNITED STATES PATENTS

| 3,902,785 | 9/1975 | Matthews | 350/96 C |
| 3,944,328 | 3/1976 | Kent et al. | 350/96 C |
| 3,948,582 | 4/1976 | Martin | 350/96 C |

*Primary Examiner*—John K. Corbin
*Assistant Examiner*—Stewart Levy

[57] ABSTRACT

The invention relates to a connector for optical fibres. The connector between two fibres comprises a pressing assembly formed by three rolls inside a flexible casing and two cones partly engaged inside the pressing assembly, at its respective ends, and a means for actuating one of the cones in a linear movement to control the opening and closing of the pressing assembly on the ends of the fibres. The invention applies to the transmitting of data by a light beam.

9 Claims, 1 Drawing Figure

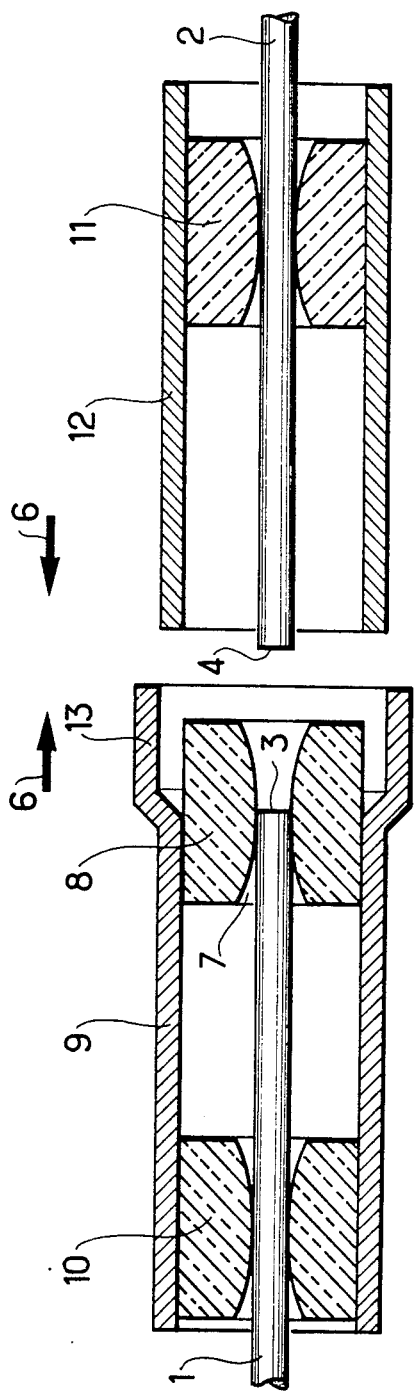

CONNECTOR FOR OPTICAL FIBRES

The invention refers to the technique of the transmission of data by means of a light beam which crosses through glass fibres having a very small diameter.

A system for transmission by light beams normally comprises an emission light source (for example a light emitting diode or a laser diode) on one side, a photosensitive receiver element (for example a photodiode) on the other side and a wave guide, more particularly of the glass fibre type. Taking into consideration the small dimensions of a glass fibre guide (the core, for example made of doped silica, for such a fibre, can have diameter of 75 $\mu$m and less and the coating, for example made of pure silica, can have a diameter of 125 $\mu$m), a very particular connection technique is needed if the very minute requirements for accuracy in alignment are to be satisfied. Now, the stability of the transmission mode decreases and the energetic attenuation of the transmission mode increases rapidly with errors in alignment. By way of an example, it is required to limit the parallel shift between the axes of the two ends of the fibres to a value in the order of 3$\mu$m, the angle between the two ends to about 1° and it is required to bring the two end faces to less than 30 $\mu$m apart.

These requirements have led, up till now, to certain devices. For example, a connector which comprises mainly a sheath which holds in position the two ends of the fibres to be connected and whose refraction index is chosen identical to that of the coating of the fibre has been described in Siemens Forschungsund Entwicklungsberichte Band 2, 1973, No. 4, pages 204,205. On inserting, between that sheath and the fibres, a liquid whose refraction index is identical to that of the core of the fibres, a part of the energy lost at the level of the connection due to the mechanical inaccuracy of the connector recovered and it is re-inserted in the fibre.

Another way of solving that problem has been described in the Archiv fur Elektronik und Ubertragungstechnik 1972, vol. 26 p. 288 and 289. In that device, the two ends of the fibres are inserted in an alignment device comprising an eccentric disk and the position of that disk is adjusted by measuring the transmission parameters. Due to the small dimensions of the fibres to be aligned, such a device is very expensive and the manipulation thereof is very delicate.

Another connection device is described in Electronics Letter, July 11, 1974, vol. 10, No. 14, p. 280-281. That device is composed of an alignment body, containing a rectilinear groove and two cylindrical parts which are previously adjusted in a concentric manner respectively at the ends of the fibres to be connected and which are alined with each other in the said groove.

The invention aims at simplifying these devices by abolishing the absolute necessity for a previous or final adjustment, without having to make use of mechanical devices which are complicated to manufacture and to operate.

In a connector for optical fibres having a very small diameter, the invention is characterized in that the two ends of the fibres to be connected are inserted on both sides in a duct crossing through a part made of a synthetic stone basically containing alumina, called the connection part, the diameter of that duct being very close to the diameter of the fibres.

The basic idea of the invention therefore consists in the choosing from among the possible materials of the connection part fitted the said duct, of a hard material which is currently machined with high precision and on an industrial scale, this making it possible to produce a connector having a low cost price and meeting the necessary requirements.

In an embodiment of the invention which provides a particular advantage, the diameter of the duct decreasses from the two openings towards the centre and only the diameter at the centre is close to the diameter of the fibre.

It can be necessary to guide the two ends of the fibres to be connected on either side of the connection part, to improve the accuracy of the angle of alignment. That guiding can be obtained by two auxilary parts, called lateral parts, which are also made of synthetic stone basically containing alumina and each provided with a duct similar to the previous one and which are installed respectively on the two fibres, on either side of the connection surface of the fibres. A rigid sheath in contact with the outside surface of the lateral parts, connects the connection part to the lateral parts.

Such a device can be adapted to be disconnectable by providing two rigid sheaths, each of which connects the lateral parts to the connection part.

The invention will be described in greater detail hereinbelow with reference to a preferred example of embodiment, which is shown in the single FIGURE. That FIGURE shows two ends 1 and 2 of wave guides or fibres to be connected for the transmission of light beams. Taking into account the necessary requirements of alignment mentioned hereinabove, the front faces 3 and 4 of those two ends are, to great advantage, prepared before the connection to be made, for example by clear breakage. The figure shows the two fibres at a certain distance from each other before the connection. To connect them together, they must be brought close together in the direction of the arrows 6 until they come into direct contact between the two front faces 3 and 4. According to the invention, the fibres are connected on the inside of a duct 7 formed in a connection part 8, made of synthetic stone basically containing alumina. That duct 7 has at its centre a diameter which corresponds almost exactly to the outside diameter of the fibre 1 and respectively of the fibre 2. Before the fitting of the fibres into the duct 7, that connection part 8 is supported by a sheath 9, made of steel for example, which surrounds it on the outside. That sheath 9 holds an auxilary part 10, called the lateral part, which is fitted onto the fibre 1 and with which it is in contact, in a coaxial position in relation to the fibre 1; the lateral part 10 is, moreover, in contact, on the outside, with the sheath 9. The front face 3 is positioned inside the connection part 8, substantially in the centre of the duct 7.

The other fibre 2 is also equipped with a lateral part 11 and with a sheath 12 analogous to the lateral part 10 and to the sheath 9 respectively. The front face 4 of the fibre 2 is free and can be inserted when the two ends of the fibres are brought together, in the connection part 8.

The connection part 8 and the lateral parts 10 and 11 are constituted by a synthetic stone basically containing alumina. They are preferably made of rubies or saphires.

To make the guiding of the fibres easier at the time of the fitting in, a circular space is provides round the connection part 8 by widening the diameter of the sheath 9, which then has a fitting end 13. The end of the sheath 12 is inserted in that space at the time of the fitting in.

The choice of ruby or of sapphire as the material for the connection part 8 and for the auxilary parts 10 and 11 between the sheathes 9, 12 and the fibres 1, 2 affords several advantages in relation to other materials. Firstly, the hardness of those materials corresponds to that of the fibre, this preventing the tearing of the material at the time of fitting in. Moreover, despite their hardness, industrial methods currently used, for example, in the watch and clock-making industry, enable a very accurate machining of parts made of those material with an excellent surface state, the materials ruby and sapphire being referred to indiscriminately as ruby in the clock-making industry. The machining methods being current, the cost of the connector is not very great.

Several fibres can be grouped together in a cable and the connection arrangement according to the invention can be applied to multiple fitting in.

It is also possible to improve the performances of the present connector by wetting the faces of the fibres to be connected with a whose refraction index is close to the index of the core of the fibre. Besides liquids known for that purpose, the applicant has observed that polyisobutylene can, to great advantage, be used for that purpose.

I claim:

1. A connector for optical fibres having a very small diameter, wherein two ends to be connected are inserted on both sides in a duct crossing through a part made of a synthetic stone basically containing alumina, constituting a connecting part, the diameter of said duct being very close to that of the fibres.

2. The connector as defined in claim 1, wherein the diameter of said duct decreases from two openings at said ends towards the center of said connecting part, the diameter at said center being close to that of the fibres.

3. The connector as defined in claim 1, wherein said synthetic stone is ruby.

4. The connector as defined in claim 1, wherein said synthetic stone is sapphire.

5. The connector as defined in claim 1, further comprising at least one auxiliary part also made of a synthetic stone basically containing alumina constituting at least one lateral part, provided with a second duct passing through it and having a diameter almost equal to that of the fibers, said lateral part being fitted on the fibers on both sides of the connecting faces of the fibers, and a rigid sheath surrounding said connecting part and said at least one lateral part, being in contact therewith, and grouping the same together.

6. The connector as defined in claim 5, wherein said sheath is in two parts that connect each one of said lateral parts to said connecting part.

7. The connector as defined in claim 6, wherein one of said sheath parts is fitted onto the other at the level of said connecting part.

8. The connector as defined in claim 1, further comprising a liquid applied to the front connecting faces of the fibers which have cores, the refraction index of said liquid being close to that of the fiber cores.

9. The connector as defined in claim 8, wherein said liquid is polyisobutylene.

* * * * *

UNITED STATES PATENT AND TRADEMARK OFFICE
CERTIFICATE OF CORRECTION

PATENT NO. : 4,015,894
DATED : April 5, 1977
INVENTOR(S) : ROCTON

It is certified that error appears in the above-identified patent and that said Letters Patent are hereby corrected as shown below:

Cancel Abstract presently appearing and substitute therefor the following:

--The invention has as its object a connector for optical fibres. It is characterized in that both the ends of two fibres to be connected are inserted on both sides in a duct crossing through a part made of synthetic stone basically containing alumina and called the connection part, the diameter of that duct being very close to the diameter of the fibres. The invention comes within the branch of data transmission by a light beam.--

Signed and Sealed this

Fourth Day of October 1977

[SEAL]

Attest:

RUTH C. MASON
Attesting Officer

LUTRELLE F. PARKER
Acting Commissioner of Patents and Trademarks